(12) United States Patent
Long et al.

(10) Patent No.: US 8,175,055 B2
(45) Date of Patent: May 8, 2012

(54) SYSTEM, APPARATUS AND METHOD FOR PROVIDING SERVICES

(75) Inventors: Shuiping Long, Shenzhen (CN); Hui Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1135 days.

(21) Appl. No.: 12/022,549

(22) Filed: Jan. 30, 2008
(Under 37 CFR 1.47)

(65) Prior Publication Data
US 2008/0186921 A1    Aug. 7, 2008

(30) Foreign Application Priority Data

Feb. 7, 2007 (CN) .......................... 2007 1 0007192
Jan. 8, 2008 (WO) ................ PCT/CN2008/070043

(51) Int. Cl.
*H04W 4/00* (2009.01)
(52) U.S. Cl. ......... 370/331; 370/338; 370/341; 370/352
(58) Field of Classification Search .................. 370/352, 370/354, 355, 356, 331, 338, 341; 709/223, 709/228; 713/202
See application file for complete search history.

(56) References Cited

U.S. PATENT DOCUMENTS

| | | | |
|---|---|---|---|
| 7,417,981 B2 * | 8/2008 | Holder et al. .................. | 370/352 |
| 2003/0212912 A1 * | 11/2003 | Bajko et al. .................... | 713/202 |
| 2005/0015499 A1 * | 1/2005 | Mayer ........................... | 709/228 |
| 2005/0203870 A1 | 9/2005 | Yamada et al. | |
| 2007/0130471 A1 | 6/2007 | Walker Pina et al. | |
| 2008/0080480 A1 * | 4/2008 | Buckley et al. ............... | 370/352 |
| 2008/0082643 A1 * | 4/2008 | Storrie et al. .................. | 709/223 |
| 2008/0117893 A1 * | 5/2008 | Witzel et al. ................... | 370/352 |

FOREIGN PATENT DOCUMENTS

CN          101043701 A          26/2007
(Continued)

OTHER PUBLICATIONS

State Intellectual Property Office of the People'S Republic of China, Examination Report in Chinese Patent Application No. 200710007192.9 (Jun. 13, 2010).

(Continued)

*Primary Examiner* — Hassan Kizou
*Assistant Examiner* — Toan Nguyen
(74) *Attorney, Agent, or Firm* — Leydig, Voit & Mayer, Ltd.

(57) ABSTRACT

A system and apparatus for providing services are provided by embodiments of the present invention. It is guaranteed that a UE is able to establish a call branch at the CS network side with a CSA. The CSA and the S-CSCF are able to establish a call branch at an IMS network side between the CSA and the S-CSCF for the UE. Embodiments of the present invention further provide a method for providing services. The method includes: registering a UE in a Circuit Switched, CS, network, registering the UE in an IP Multimedia Sub-system, IMS, network and establishing a call branch at the CS network side between the UE and the IMS network for an IMS session, wherein registering the UE in the IMS network comprises registering CS access capability of the UE in the IMS network. The system, apparatus and method provided by embodiments of the present invention for providing services may support a UE to access an IMS service platform via a CS network, which effectively reduces the cost.

1 Claim, 7 Drawing Sheets

FOREIGN PATENT DOCUMENTS

| | | |
|---|---|---|
| CN | 1664840 A | 7/2005 |
| CN | 1849837 A | 10/2006 |
| CN | 1859723 A | 11/2006 |
| CN | 1874327 A | 12/2006 |
| CN | 101043701 A | 9/2007 |
| EP | 1 662 833 A1 | 5/2006 |

OTHER PUBLICATIONS

European Patent Office, Extended European Search Report in European Patent Application No. 10160604.4 (Jun. 10, 2010).

Motorola et al., "USSD Based Call Flows S2H060017," Internet Citation [Online], XP002466593, Retrieved from the Internet: URL: http://www.3gpp.org/ftp/tsg_sa/WG2_Arch/Ad-hoc_meetings/2006_03_VCC_Munich/Docs/S2H060017.zip> (Mar. 21, 2006).

Telecom Italia, "VCC Architecture, Functional Components," 3GPP Draft; S2-061781, $3^{rd}$ Generation Partnership Project (3GPP), vol. SA WG2, No. Shanghai 20060509, XP050255917 (May 9, 2006).

Global System for Mobile Communications (GSM), Digital Cellular Telecomunications System (Phase 2+); Universal Mobile Telecommunications System (UMTS); IP Multimedia Subsystem (IMS); Stage 2; $3^{rd}$ Generation Partnership Project (3GPP); Technical Specification, vol. 123.228, No. V7.6.0—Release 7 (Dec. 1, 2006).

NEC, "Architecture Proposal for IMS Centralized Services," 3GPP TSG SA WG2 Architecture—S2#56; S2-070059 (Jan. 15-19, 2007).

Global System for Mobile Communications (GSM), Combining Circuit Switched (CS) and IP Multimedia Subsystem (IMS) Services; Stage 2 (Release 7); $3^{rd}$ Generation Partnership Project; Technical Specification Group Services and System Aspects; 3GPP TS 23.279 V7.5.0 (Dec. 2006).

3GPP, "$3^{rd}$ Generation Partnership Project; Technical Specification Group Services and System Aspects; Combining Circuit Switched (CS) and IP Multimedia Subsystem (IMS) Services; Stage 2 (Release 7)," 3GPP TS 23.279 V7.5.0: 1-35 (Dec. 11, 2006).

ETSI Standards, "Digital Cellular Telecommunications System (Phase 2+): Universal Mobile Telecommunications System (UMTS); Cx and Dx Interfaces Based on the Diameter Protocol; Protocol Details (3GPP TS 29.229 version 7.4.0 Release 7)," 3-CN4(V7.4.0): 6-10 (Dec. 1, 2006).

Motorola et al., "USSD Based Call Flows; S2H060017," http://www.3gpp.org/ftp/tsg_sa/WG2_Arch/Ad-hoc_meetings/2006_03_VCC_Munic/Docs/S2H060017.zip , 2-9 (Mar. 21, 2006).

NEC, "Architecture Proposal for IMS Centralized Services," http://www.3gpp.org/ftp/tsg_sa/WG2_Arch/TSGS2_56_Florence/Docs/S2-070059.zip , (Jan. 9, 2007).

European Patent Office, Summons to Attend Oral Proceedings in European Patent Application No. 081013623.5 (Dec. 4, 2009).

State Intellectual Property Office of the People's Republic of China, Written Opinion of the International Searching Authority in International Patent Application No. PCT/CN2008/070043 (Mar. 17, 2008).

$2^{nd}$ Office Action in corresponding Chinese Application No. 200710007192.9 (Dec. 3, 2010).

"3GPP TR 23.982—3rd Generation Partnership Project; Technical Specification Group Services and System Aspects; IP Multimedia System (IMS) centralized services (Release 8)," Jan. 2007, Version 0.2.0, $3^{rd}$ Generation Partnership Project, Valbonne, France.

\* cited by examiner

SYSTEM, APPARATUS AND METHOD FOR PROVIDING SERVICES

CROSS-REFERENCE TO RELATED APPLICATIONS

This application claims priority to Chinese Patent Application No. 200710007192.9, filed Feb. 7, 2007, and to International Patent Application No. PCT/CN2008/070043, filed Jan. 8, 2008, both of which are hereby incorporated by reference.

FIELD OF THE INVENTION

The present invention relates to communication technologies, and more particularly, to a system, apparatus and methods for providing services.

BACKGROUND OF THE INVENTION

At present, the mobile communication network is mainly on the basis of Circuit-Switched (CS) such as Global System for Mobile communications (GSM) and Code Division Multiple Access (CDMA). Various operators establish relatively perfect and abundant service platforms on the basis of a CS network. The service presentation of the CS network needs the support of Mobile Switched Center (MSC) in a roaming area, which is not favorable for the introduction of a new service. IP Multimedia Sub-system (IMS) is an IP-switch-based service network. The service presentation of IMS is independent of the roaming area, which is favorable for the introduction of a new multimedia service. IMS supports a User Equipment (UE) to perform an IMS multimedia service via various packet-switching access networks.

Because the IMS network is a relatively complex network, the overall deployment of an IMS network can not be completed within a short period of time. Therefore, the CS network and the IMS network will coexist within a certain period. In this way, the operator may need to establish two service platforms for a new service in the CS network and the IMS network, which increases the costs of building and operating. To sum up, it is very necessary to provide a technology for a UE accessing an IMS service platform via a CS network to reduce the cost and facilitate the smooth evolution from the CS network to the IMS network. However, there is no such technology at present.

SUMMARY

In view of the above, some embodiments of the present invention provide a system and methods for providing services to support a UE to access an IMS service platform via a CS network, which effectively reduces the cost.

Other embodiments of the present invention provide apparatus for providing services, to support a UE to access an IMS service platform via a CS network, which effectively reduces the cost.

The technical scheme of the present invention is given as follows.

A system for providing services includes: a User Equipment, UE, registered in a Circuit Switched, CS, network, a Serving-Call Session Control Function, S-CSCF, located at an IP Multimedia Sub-system, IMS, network and a CS Adapter, CSA; at least one of the UE, S-CSCF and CSA is adapted to initiate registration for the UE in the IMS network; an HSS at the IMS network side is adapted to provide user configuration data of the UE during the process of the registration of the UE in the IMS network, and register the UE in the IMS network, wherein the process of registering the UE in the IMS network comprises registering CS access capability of the UE in the IMS network; the UE and the CSA are adapted to establish a call branch at the CS network side.

A method for providing services includes:
registering a UE in a Circuit Switched, CS, network;
registering the UE in an IP Multimedia Sub-system, IMS, network; and
establishing a call branch at the CS network side between the UE and the IMS network for an IMS session;
registering the UE in the IMS network comprises registering CS access capability of the UE in the IMS network.

A method for UE accessing an IP Multimedia Sub-system, IMS, network via a Circuit Switched, CS, network includes:
registering in a CS network;
sending an Unstructured Supplementary Service Data, USSD, Request to an IMS network;
registering CS access capability of the UE in the IMS network; and
establishing a call branch at the CS network side with the IMS network for an IMS session.

An apparatus for providing service includes: a call processing module at a UE side, a registration module at the UE side and a communication module at the UE side, being connected to each other, any of which is used for saving the address of a Circuit Switched Adapter, CSA;
the registration module is adapted to register CS access capability of the apparatus in an IP Multimedia Sub-system, IMS, network;
the call processing module is adapted to generate call establishment information, and establish a call branch at the CS network side between the UE and the CSA; and
the communication module is adapted to transmit the call establishment information to the CSA.

An apparatus for providing services includes: a call processing module at a Circuit Switched Adapter, CSA, side, a registration module at the CSA side and a communication module at the CSA side, which are connected to each other;
the registration module is adapted to register CS access capability of the UE in an IMS network;
the call processing module is adapted to generate call establishment information, and establish a call branch at the CS network side between the UE and an IP Multimedia Sub-system, IMS, network; and
the communication module is adapted to transmit the call establishment information to the CSA.

In comparison with a conventional method, the system, apparatus and method provided by embodiments of the present invention may support a UE to access an IMS service platform via a CS network, which may effectively reduce the cost.

DETAILED DESCRIPTION OF THE INVENTION

A detailed description of the present invention is provided hereinafter with reference to the attached drawings and specific embodiments.

The system provided by embodiments of the present invention for providing services includes: a UE registered in a CS network, a Serving-Call Session Control Function (S-CSCF), located at an IMS network and a CSA. At least one of the UE, S-CSCF and CSA is adapted to initiate registration for the UE in the IMS network. An HSS at the IMS network side is adapted to provide user configuration data of the UE during the process of the registration for the UE in the IMS network. In communication, the UE and the CSA are adapted to establish a call branch at the CS network side.

The method provided by embodiments of the present invention for providing services includes: registering in a Circuit Switched, CS, network for a UE; registering in an IP Multimedia Sub-system, IMS, network for the UE; and establishing a call branch between the UE and the IMS network to perform an IMS session.

The apparatus provided by embodiments of the present invention for providing services includes modules connected to each other at a UE side, including a call processing module, a registration module and a communication module, any of which is used for saving the address of a CSA. The communication module at the UE side is adapted to transmit bidirectional authentication information between the UE and the S-CSCF and call establishment information. The registration module at the UE side is adapted to implement IMS registration with a CS accessing technology. The call processing module at the UE side is adapted to establish a call branch at a CS network side between the UE and the CSA.

Another apparatus provided by embodiments of the present invention for providing services includes modules connected to each other at a UE side, including a call processing module, a registration module and a communication module. The communication module at the CSA side is adapted to transmit bidirectional authentication information between a UE and an S-CSCF and call establishment information. The registration module at the CSA side is adapted to implement IMS registration of the UE. The call processing module at the CSA side is adapted to establish a CS call branch between the UE and an IMS network.

Figure 1:
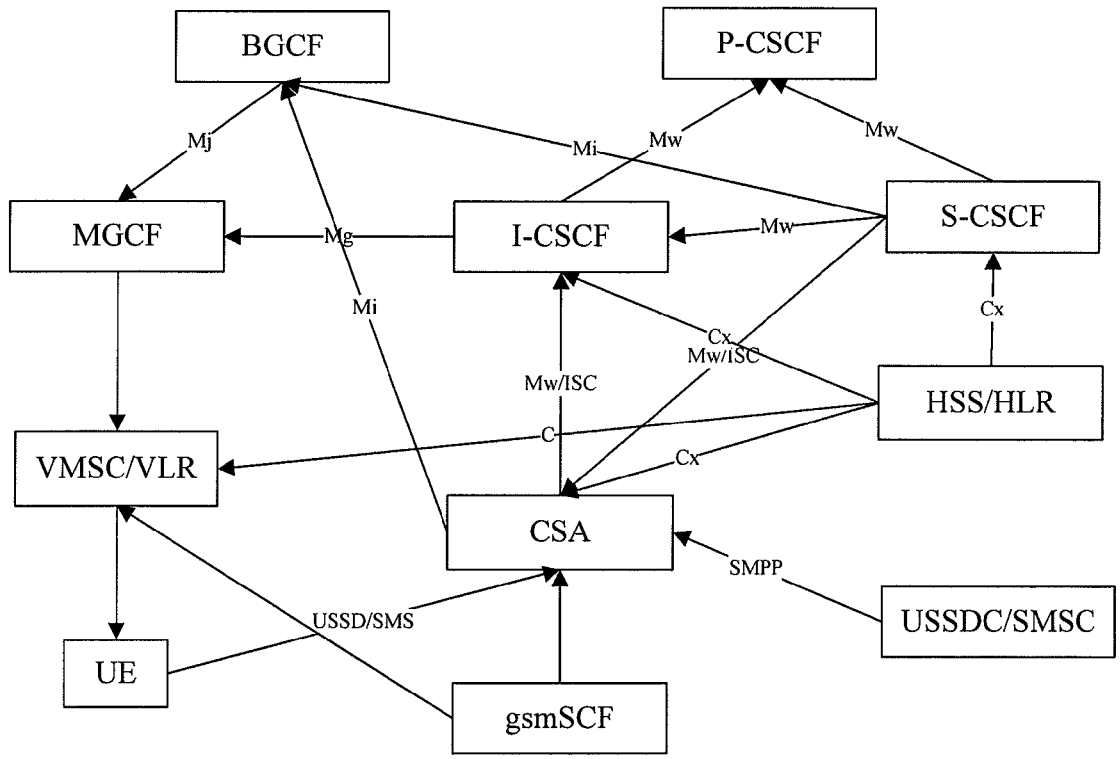
FIG. 1 is a network structure schematic diagram illustrating a system for providing services in accordance with an embodiment of the present invention.

FIG. 1 is a network structure schematic diagram illustrating a system for providing services in accordance with an embodiment of the present invention. In FIG. 1, A Proxy-Call Session Control Function (P-CSCF) is a first connection point for a user in accessing an IMS network. The P-CSCF may provide an agent function such as accepting and transferring a service request. However, The P-CSCF can not modify a Request Uniform Resource Identifier (URI) field in an INVITE. The P-CSCF may also provide a User Agent (UA) function such as interrupting or independently creating a Session Initiation Protocol (SIP) session in an abnormal case.

A Serving-Call Session Control Function (S-CSCF) is the core controlling function in the IMS core network and is responsible for the registration authentication and session control of a UE. The S-CSCF performs a basic session routing function for a calling IMS user and a called IMS user. The S-CSCF may further trigger a value-added service routing to an application server (AS) and perform a service control interaction when certain conditions are satisfied according to an IMS triggering rule subscribed by a user.

An Interrogating-Call Session Control Function (I-CSCF) is similar to a gateway node of IMS and is used for allocating S-CSCF for a user in this network, providing a route inquiry function and a topology hiding function between IMS domains.

A Home Subscriber Server (HSS) is a centralized and integrated database for saving subscription information of an IMS user in the home network and is located at the top layer of the IMS core network architecture. The subscription information generally includes a basic ID, routing information and service subscription information. The HSS includes the function of a Home Location Register (HLR). The HLR is a Home Location Register of a CS network, and the HLR is used for saving service information of a home subscription user.

An AS is used for providing an IMS user with an IP multimedia value-added service and is located at the home network of the IMS user or is provided by a third party.

A Media Gateway Control Function (MGCF) is used for implementing the interaction between the IMS core control plane and the Public Switched Telephone Network (PSTN) or the CS network, supporting the protocol interaction and call inter-working between the Integrated Services Digital Network User Part (ISUP)/Bearer Independent Call Control (BICC) and the SIP. The MGCF is further used for controlling the IMS-Media Gateway (MGW) to implement the real-time conversion between the Time Division Multiplex (TDM) bearer of the PSTN or CS network and the Real Time Protocol (RTP) of the IMS network user plane via the H.248.

An IMS-MGW is used for implementing the user plane inter-working between the IMS and the PSTN and CS network as well as a necessary coding and decoding conversion.

A Breakout Gateway Control Function (BGCF) is used for selecting an MGCF and a BGCF of another network for a call from the IMS to the PSTN or CS network according to a configured inter-working rule or the analysis of the called.

Visit Mobile Services Switching Center (VMSC)/Visit Location Register (VLR): An MSC is a call and service control center at the CS network side. A VMSC refers to an MSC in a visiting area. A VLR is a Visiting Location register for saving location information of all users in the current control area.

An Unstructured Supplementary Service Data Center (USSDC) and a Short Message Service Center (SMSC) are respectively message center of the USSD and the SMS, both of which can communicate with a CSA via the Short Message Peer to Peer (SMPP) protocol. The above USSD and SMS are respectively two types of data transmitting paths in the CS network.

A CSA is a newly-introduced network element. The CSA is used for assisting a UE in registering in the IMS network, delivering a coming call to the CS domain, controlling a calling call in accessing the IMS network, and sending a call to the S-CSCF for call and session processing.

In principle, if a UE covered by a CS network (GSM/UMTS/CDMA) performs the IMS registration and the UE adopts a CS accessing technology, the IMS network allocates an S-CSCF to serve the UE. In the IMS registration process, the operation performed by the S-CSCF mainly includes registering the address of a CSA, delivering the call of a UE in the CS network, and transferring the call to the CSA. The S-CSCF is further required to register a Public Subscribe Identity at least, so that a call may be established when the registered Public Subscribe Identity is called by another user. During a call, the S-CSCF is required to obtain user configuration data of the UE from the HSS. And subsequent processing for the established call is performed according to the user configuration data of the UE.

The process for registering a UE in the IMS, delivering a coming call to the CS domain and controlling a UE calling call to enter an IMS network is described as follows.

Figure 2:
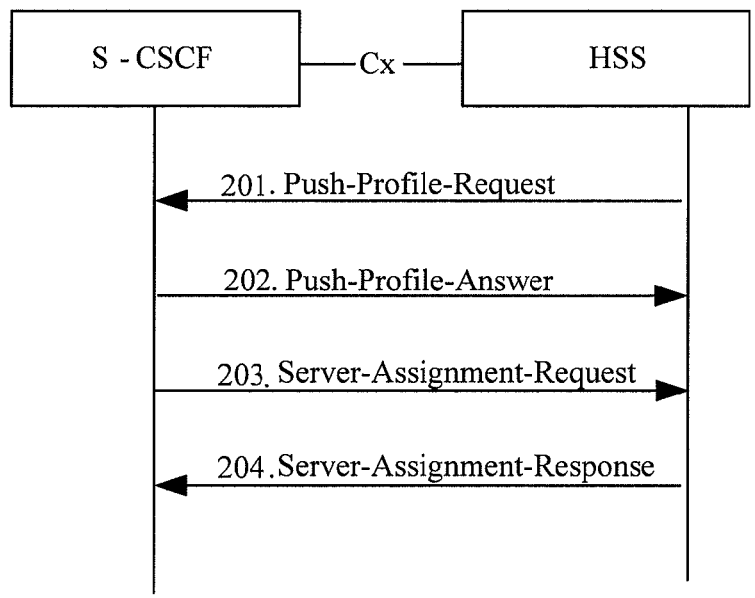
FIG. 2 is a flowchart illustrating a method of the registration of a UE in an IMS network in accordance with an embodiment of the present invention.

As shown in FIG. 2, FIG. 2 is a flowchart illustrating a method of the registration of a UE in an IMS network in accordance with an embodiment of the present invention. The method includes processes described as follows.

Process 201: After a UE has registered in a CS network, an HSS sends a Push-Profile-Request (PPR) to an S-CSCF in an IMS network. The PPR carries a private user ID and user configuration data of the UE. The user configuration data of the UE includes a newly-set "the CS network registration is performed" (CS-registered) parameter. It is noted that the "CS-registered" parameter indicates CS access capability of the UE. The process of sending, by the HSS, the PPR carrying the "CS-registered" parameter to the S-CSCF in the IMS network indicates that the HSS registers the CS access capability of the UE in the IMS network.

Process 202: The S-CSCF saves the private user ID and user configuration data of the UE sent from the HSS, determines that the UE has registered in the CS network according to the CS-registered parameter, and sends a Push-Profile-Answer (PPA) to the HSS.

Process 203: If the S-CSCF has not received complete user configuration data of the UE, the S-CSCF sends a Server-Assignment-Request (SAR) to the HSS. The SAR carries the private user ID and public user ID of the UE to indicate which S-CSCF serving the UE (private user ID), and requests to download the user configuration data of the designated UE from the HSS.

Process 204: The HSS sends to the S-CSCF a Server-Assignment-Response (SAR) carrying the requested user configuration data of the UE.

The above user configuration data of the UE carries the address of at least one CSA. The S-CSCF saves the address of at least one CSA. The Diameter protocol is used between the S-CSCF and the HSS.

Certainly, if the UE has deregistered from the CS network, the HSS indicates "CS-deregistered". Correspondingly, the S-CSCF deletes the user configuration data of the UE.

Figure 3:
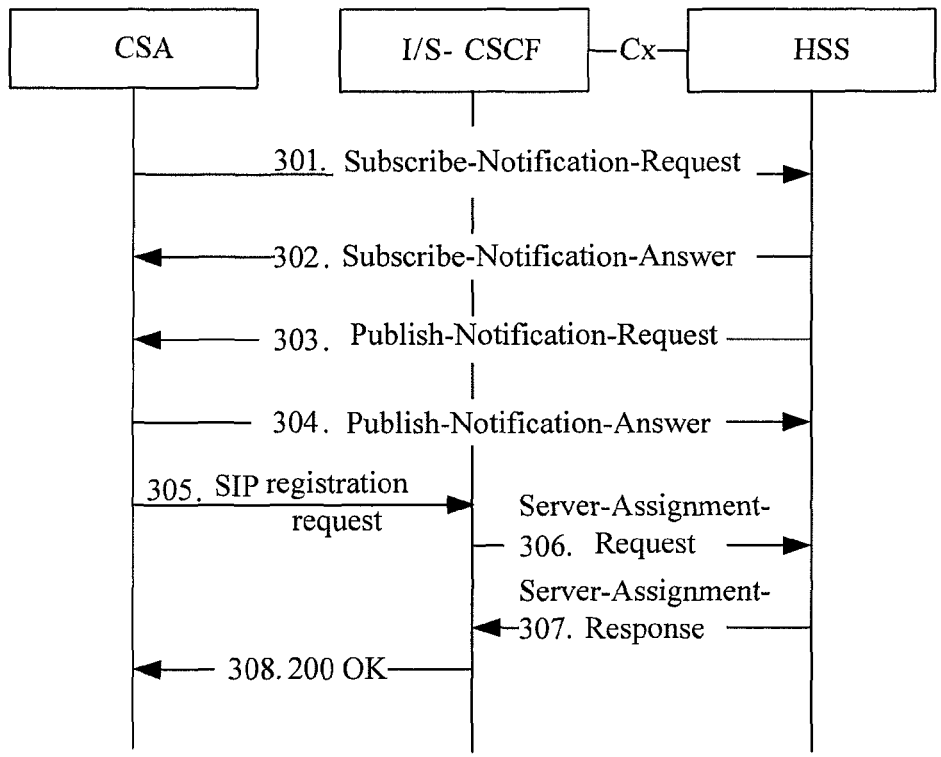
FIG. 3 is a flowchart illustrating another method of the registration of a UE in an IMS network in accordance with an embodiment of the present invention.

In practical applications, the registration may further be initiated by the CSA as shown in FIG. 3. As shown in FIG. 3, it is a flowchart illustrating another method of the registration of a UE in an IMS network in accordance with an embodiment of the present invention. The method includes processes described as follows.

Process 301: A CSA sends to an HSS a Subscribe-Notification-Request (SNR) carrying a public user ID of a UE and data to be subscribed.

Process 302: The HSS sends a Subscribe-Notification-Answer (SNA) to the CSA to determine that the subscription is successful.

In general, the CSA subscribes data information from the HSS for a designated user. When some data of the designated user is updated, the HSS may send the changed data to the CSA, so that the CSA may acquire the changing time of the subscribed data.

Process 303: when the UE has registered in the CS network, the HSS sends to the CSA a Publish-Notification-Request (PNR) carrying the "CS-registered" parameter and the public user ID. It is noted that the "CS-registered" parameter indicates CS access capability of the UE. The process of sending, by the HSS, the PNR carrying the "CS-registered" parameter to the CSA indicates that the HSS registers the CS access capability of the UE in the IMS network.

Process 304: Upon the receipt of the PNR from the HSS, the CSA sends a Publish-Notification-Answer (PNA) to the HSS for acknowledgement.

Process 305: The CSA searches a private user ID of the UE according to the received public user ID, generates a SIP Register request carrying the public user ID to be registered and the private user ID, and sends the SIP Register request to the S-CSCF directly or via an I-CSCF to request to perform the registration for the UE in the IMS network and instruct to adopt a CS accessing technology.

Process 306: The S-CSCF sends to the HSS a Server-Assignment-Request (SAR) carrying the private user ID and the public user ID of the UE, indicates which S-CSCF serves the UE (private user ID), and requests to download the user configuration data of the designated UE from the HSS.

Process 307: The HSS sends to the S-CSCF a Server-Assignment-Response (SAR) carrying the requested user configuration data of the UE.

Process 308: The S-CSCF receives and saves the user configuration data of the UE sent from the HSS, and returns a 200 Ok message to the CSA to indicate that the registration is successful.

Certainly, if the UE has deregistered from the CS network, the CSA performs the IMS deregistration. Correspondingly, the S-CSCF deletes the user configuration data of the UE.

Figure 4:
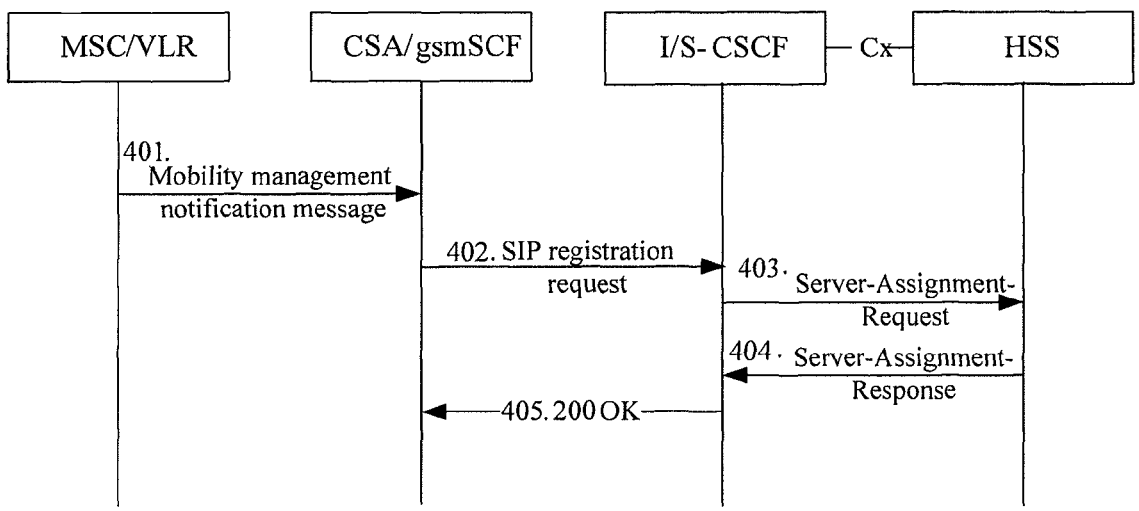
FIG. 4 is a flowchart illustrating another method of the registration of a UE in an IMS network in accordance with an embodiment of the present invention.

The operation for a CSA initiating a registration may also be shown in FIG. 4. As shown in FIG. 4, it is a flowchart illustrating another method of the registration of a UE in an IMS network in accordance with an embodiment of the present invention. The method includes processes described as follows.

Process 401: A CSA receives a mobility management notification message sent from a VLR via a CAMEL mechanism. The message indicates that a UE has performed "IMSI attached", i.e. the UE has registered in the CS network.

Process 402: The CSA generates a SIP registration request, and sends the SIP registration request to the S-CSCF directly or via an I-CSCF, requests for performing the IMS registration for the UE, and instructs to adopt a CS accessing technology.

Process 403: The S-CSCF sends to the HSS a Server-Assignment-Request (SAR) carrying a private user ID and a public user ID of the UE, indicates which S-CSCF serves the UE (private user ID), and requests to download user configuration data of the designated UE from the HSS.

Process 404: The HSS sends to the S-CSCF a Server-Assignment-Response (SAR) carrying the requested user configuration data of the UE.

Process 405: The S-CSCF receives and saves the user configuration data of the UE sent from the HSS, and returns a 200 Ok message to the CSA to indicate that the registration is successful.

Figure 5:
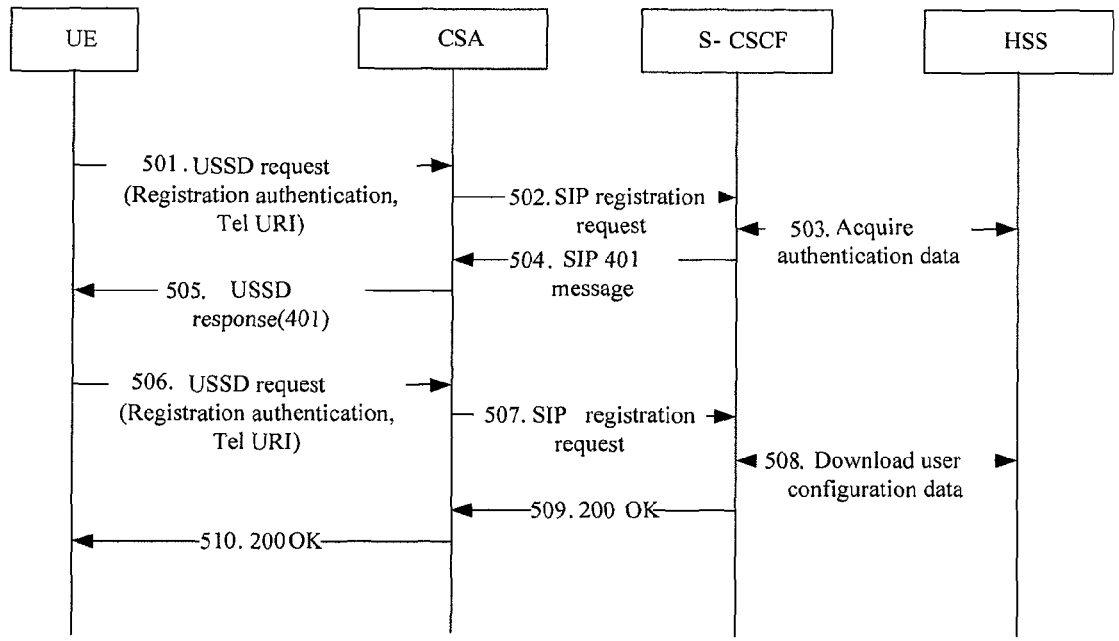
FIG. 5 is a flowchart illustrating another method of the registration of a UE in an IMS network in accordance with an embodiment of the present invention.

In practical applications, a registration may be initiated by a UE as shown in FIG. 5. FIG. 5 is a flowchart illustrating another method of the registration of a UE in an IMS network in accordance with an embodiment of the present invention. In FIG. 5, Tom is supposed to use an IMS terminal (hereinafter referred to as UE) and has two public user ID including SIP URI: tom@home.cn and Tel URI: +8615912345678. The home domain of Tom is home.cn. The private user ID of Tom is private@home.cn. The SIP address of a CSA serving Tom is csa.home.cn. The serving code of USSD is 121. The SIP address of the S-CSCF in the home domain of Tom is scscf1.home.cn.

When Tom holding a UE enters an area covered by a CS network, the UE initiates an IMS registration according to the following processes.

Process 501: After initiating an IMSI Attach procedure in the CS network successfully, the UE reads related parameters and presets USSD service codes to form a USSD Request message, and sends the USSD request message to the network. The USSD Request message includes the following contents:

USSD service code: 121;
Home domain name: home.cn;
The public user ID to be registered: Tel URI: +8615912345678; and
Private user ID: private@home.cn.

The USSD Request message is routed to a CSA in the home IMS network of the UE via the MSC or VLR and HLR according to the USSD service codes. The UE establishes a USSD connection with the CSA.

Process 502: Upon the receipt of the USSD Request message, the CSA reads information relating to the IMS registration to form a SIP registration request:

```
REGISTER sip:home.cn SIP/2.0
Via: SIP/2.0/UDP sip:csa.home.cn;branch=0pctb
Path: csa.home.cn
From: <+8615912345678>;tag=pohja
To: <+8615912345678>
Contact: <tel: +8615912345678>;expires=60000
Call-ID: apbafadsa34dsa542
CSeq: 25 REGISTER
Authorization: Digest username="private@home.cn",
realm = "home.cn",
    nonce = "",
    uri="sip:home.cn",
    response=""
```

Afterwards, the CSA parses the home domain name (or an I-CSCF address is set) via the DNS to acquire the address of an I-CSCF of the user home domain, and transfers the SIP registration request to the I-CSCF. After the SIP registration request is received by the I-CSCF, the I-CSCF queries whether the HSS has finished the IMS registration. If the HSS has finished the IMS registration, the I-CSCF acquires the address of the S-CSCF serving the UE; otherwise, the I-CSCF allocates an S-CSCF, and sends the SIP registration request to the S-CSCF. Alternatively, the CSA directly sends a SIP registration request to the S-CSCF; the address of the S-CSCF may be saved in the CSA or received from the UE.

Process 503: The S-CSCF serving the UE downloads an Authentication Vector (AV) from the HSS according to a Username parameter carried in the received SIP registration request. The AV includes a random number (RAND), an Expected Response value (XRES), a Ciphering Key (CK), an Integrity Key (IK) and an Authentication Token (AUTN).

Process 504: The S-CSCF serving the UE generates a SIP 401 (unauthorized) message, and returns the SIP 401 message to the CSA along the route of the SIP registration request. The nonce message header of the SIP registration request carries an AUTN parameter and a RAND parameter.

The content of the SIP 401 message generally includes:

```
SIP/2.0 401 Unauthorized
From: <+8615912345678>;tag= pohja
To: <+8615912345678>;tag=gasba
Contact: <tel: +8615912345678>;expires=60000
Call-ID: apbafadsa34dsa542
CSeq: 25 REGISTER
WWW-Authenticate: Digest realm = "home.cn"
    nonce = A34Cm+Fva37UYWpGNB34JP
    algorithm = AKAv1-MD5
    ik = "0123456789abcdeedcba9876543210"
    ck = "9876543210abcdeedcba0123456789"
```

Process 505: Upon the receipt of the SIP 401 (unauthorized) message, the CSA encapsulates a response code, nonce and algorithm parameter of the message into a USSD response, and sends the USSD response to the UE via a USSD connection. Moreover, the CSA reads and saves the IK and CK parameter of the SIP 401 (unauthorized) message.

Process 506: Upon the receipt of the USSD message sent from the CSA, the UE reads the AUTN and RAND from the nonce of the message, learns that the sequence number (SQN) between the HSS and the ISIM is in synchronization status via the AUTN, and determines that the SIP 401 message is actually sent from the home domain of the UE. Therefore, the authentication of the network is finished.

According to the received RAND and the sharing key, the UE generates a response value (RES) needed by the response, generates another USSD request and sends the USSD request to the CSA. The USSD request includes the following content:

Home domain name: home.cn;
The public user ID to be registered: +8615912345678;
Private user ID: private@home.cn;
nonce: A34Cm+Fva37UYWpGNB34JP;
RES: 6629fae49393a05397450978507c4ef1.

Process 507: Upon the receipt of the USSD request from the UE, the CSA converts the USSD request to a SIP registration request. The SIP registration request includes:

```
REGISTER sip:home.cn SIP/2.0
Via: SIP/2.0/UDP sip:csa.home.cn;branch=2pctb
Path: csa.home.cn
From: <+8615912345678>;tag=ulkomaa
To: <+8615912345678>
Contact: <tel: +8615912345678>;expires=60000
Call-ID: spnafadsa34d49222
CSeq: 43 REGISTER
Authorization: Digest username="private@home.cn",
realm = "home.cn",
    nonce = A34Cm+Fva37UYWpGNB34JP,
    uri="sip:home.cn" ,
    response="6629fae49393a05397450978507c4ef1".
```

The SIP registration request sent from the CSA indicates that the UE has registered in the CS network, and CS access capability of the UE will be registered in the IMS network.

Afterwards, the CSA parses the home domain name (or an I-CSCF address is set) via the DNS to acquire the address of an I-CSCF of the user home domain, and transfers the SIP registration request to the I-CSCF. When the I-CSCF receives the SIP registration request, the I-CSCF queries whether the HSS has finished the IMS registration. If the HSS has finished the IMS registration, the I-CSCF acquires the address of the S-CSCF serving the UE; otherwise, the I-CSCF allocates an S-CSCF, and sends the SIP registration request to the S-CSCF. Alternatively, the CSA directly sends a SIP registration request to the S-CSCF. The address of S-CSCF may be saved in the CSA or received from the UE.

Process 508: The S-CSCF serving the UE compares the received RES with the XRES in the AV, and determines that the UE has passed the authentication successfully when the RES is identical with the XRES.

As the authentication succeeds, the S-CSCF serving the UE downloads user configuration data from the HSS.

The S-CSCF serving the UE records the information of the IMS registration of the UE:

The public user ID used for performing the IMS registration of the UE: +8615912345678;
Contact address of the UE: +8615912345678;
The IMS registration state: registered;
The access technology of the IMS registration: CS access;
The address of the CSA: cas.home.cn.

Process 509: The S-CSCF serving the UE generates a 200 OK response message, and returns the 200 OK response message to the CSA along the route of the SIP registration request.

The 200 response message includes:
SIP/2.0 200 OK
From: <+8615912345678>;tag=ulkomaa
To: <+8615912345678>;tag=kotimaa
Contact: <tel: +8615912345678>;expires=60000
Call-ID: spnafadsa34d49222
CSeq: 43 REGISTER
Service-Route: orig@sip:scscf.home.cn
Content-Length: 0

Process 510: Upon the receipt of the 200 OK response message sent from the S-CSCF, the CSA reads and saves orig@sip:scscf.home.cn carried by the Service-Route message header of the 200 OK response message.

The CAS further encapsulates the content of the 200 OK message of the response code into a USSD message, and sends the message to the UE via a USSD connection.

By the above processes, the UE of Tom finishes the IMS registration with the CS access technology. In this way, Tom may acquire IMS services according to the CS network via the UE.

In general, the UE may communicate with a CSA via a mode such as USSD/SMS, and perform the IMS registration via the CSA. In the process of the registration, the UE needs to report the private user ID and the public user ID to be registered, and performs the bidirectional authentication with the S-CSCF. In addition, in the process of registration, the CSA and the UE may negotiate a SIP compression algorithm (RFC3320 standard is currently used). The compressed SIP message is transmitted between the CSA and the UE subsequently to reduce the burden carried by the USSD/SMS of the CS network.

Figure 6:
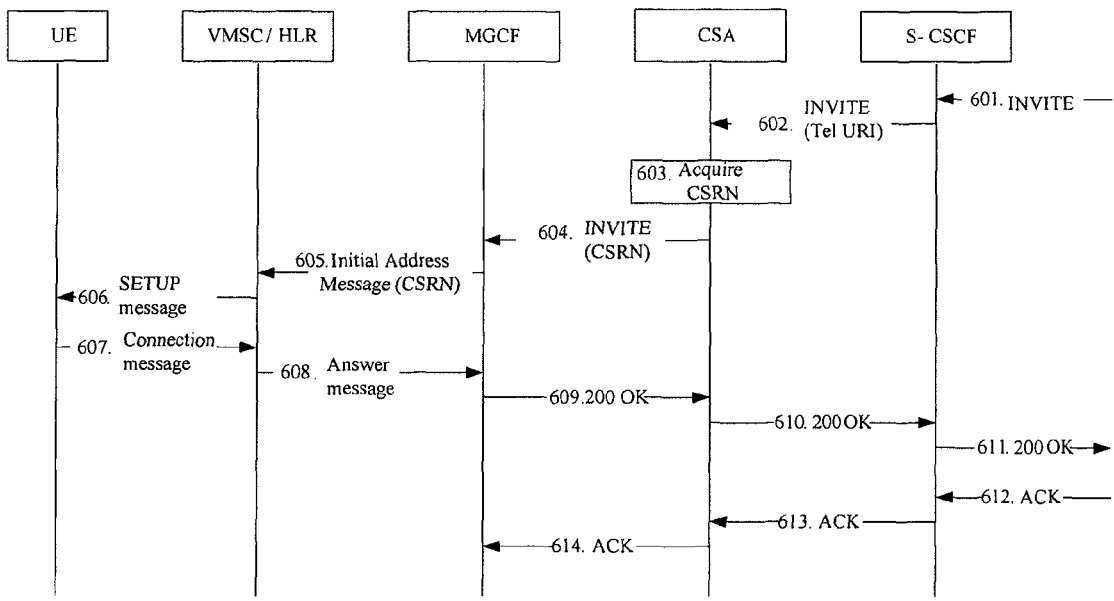
FIG. 6 is a flowchart illustrating a method for delivering a coming call in accordance with an embodiment of the present invention.
Figure 9:
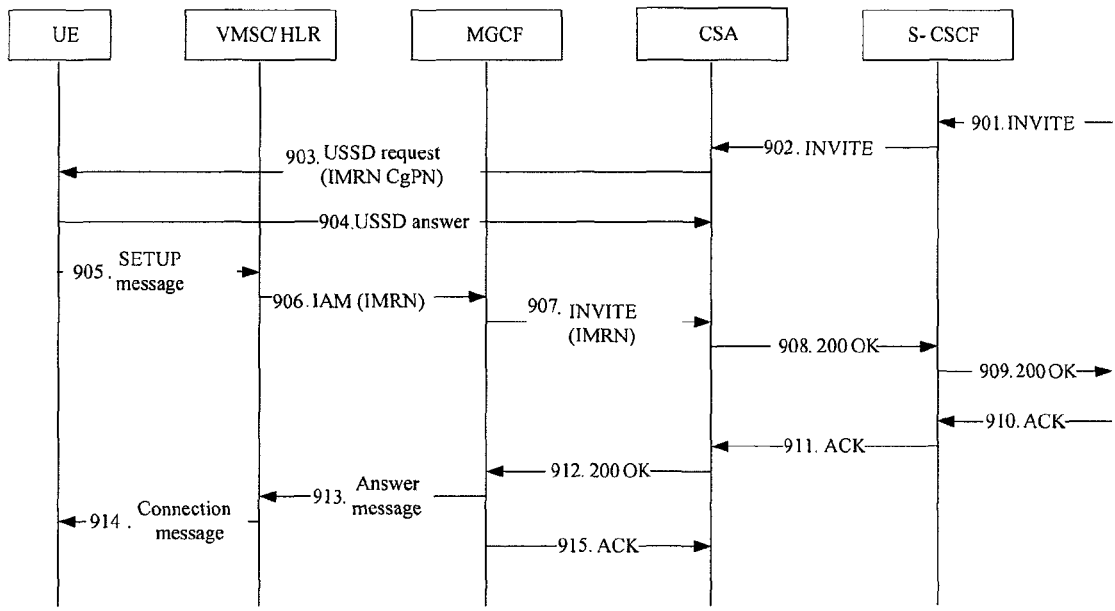
FIG. 9 is a flowchart illustrating another method for delivering a coming call in accordance with an embodiment of the present invention.
Figure 10:
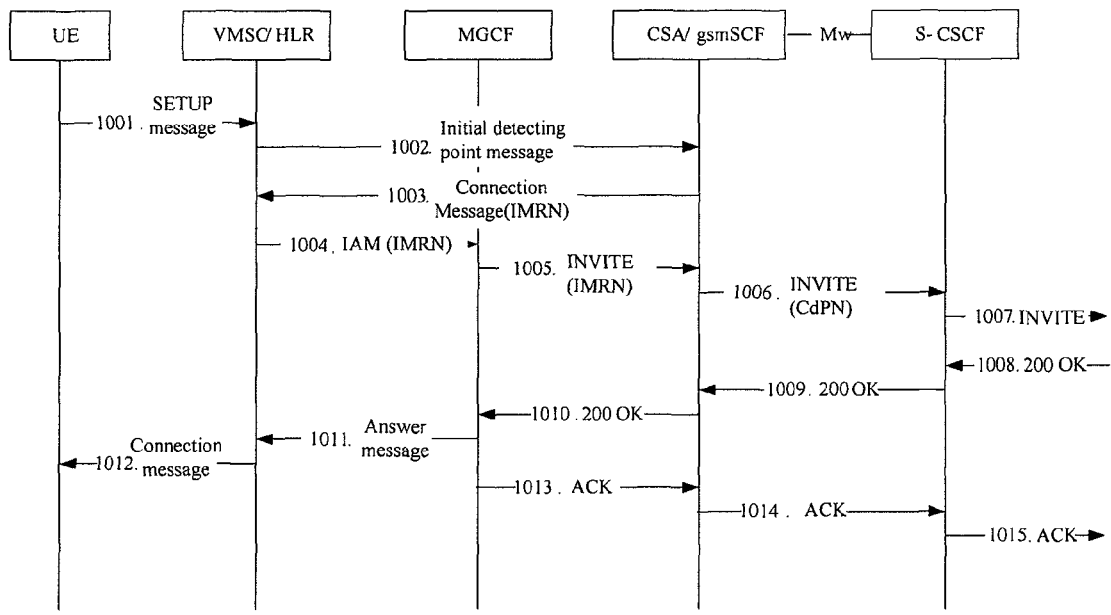
FIG. 10 is a flowchart illustrating a method for a UE initiating a call in accordance with an embodiment of the present invention.
Figure 11:
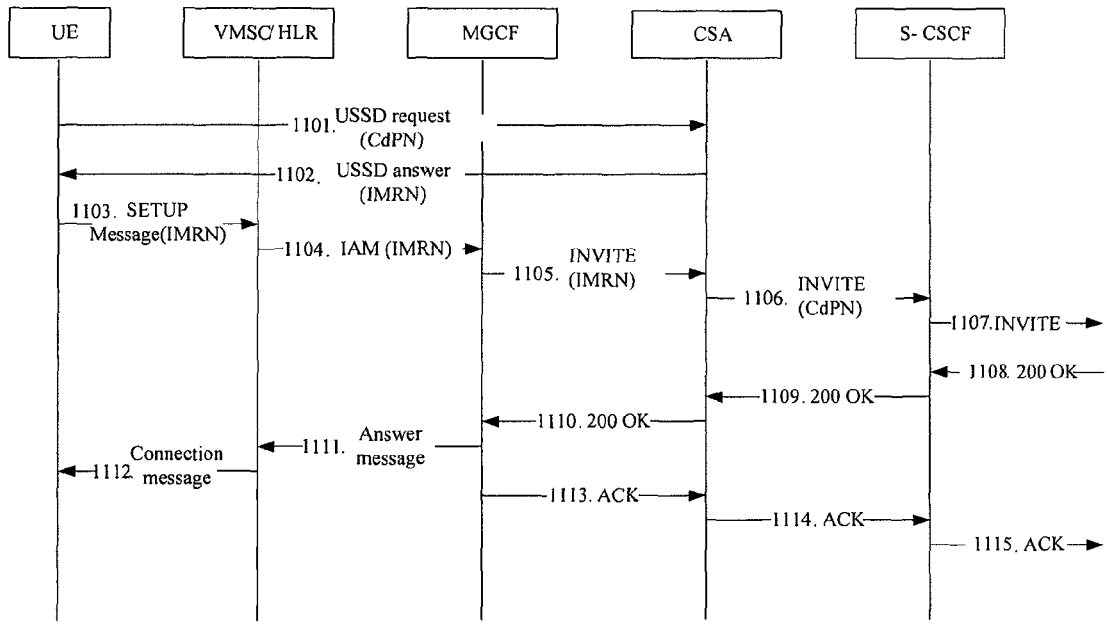
FIG. 11 is a flowchart illustrating another method for a UE initiating a call in accordance with an embodiment of the present invention.

After finishing the IMS registration, the UE registered in the CS network may access the IMS service platform via the CS network. At this point, a coming call may be delivered to the UE located at the CS domain (as shown in FIGS. 6 and 9). A calling call of the UE may be controlled to enter the IMS network (as shown in FIGS. 10 and 11).

As shown in FIG. 6, it is a flowchart illustrating a method for delivering a coming call in accordance with an embodiment of the present invention. The method includes processes described as follows.

Process 601: An INVITE from a calling terminal located at an IMS network is received by an S-CSCF.

Process 602: The S-CSCF transfers the INVITE to a CSA according to the address of the CSA registered during the IMS registration. In practical applications, the S-CSCF may change a Request Uniform Resource Identifiers (URI) of the INVITE from a SIP URI to a Tel URI.

Process 603: The CSA acquires a Circuit Switched domain Routing Number (CSRN), and configures the Request URI of the INVITE as the CSRN.

Process 604: The CSA sends the INVITE to an MGCF via a BGCF.

Process 605: The MGCF generates an Initial Address Message (IAM) according to the received INVITE, and sends the IAM to a VMSC.

Process 606: Upon the receipt of the IAM sent from the MGCF, the VMSC sends a Setup message to the UE to indicate that the call is received.

Process 607: The UE answers the call by sending a Connect message to the VMSC.

Process 608: The VMSC generates an Answer Message (ANM), and sends the ANM to the MGCF to indicate that the UE has answered the call.

Processes 609 to 611: The MGCF generates a 200 OK message, and sends the 200 OK message to the CSA via the BGCF. The CSA sends the 200 OK message to the calling terminal via the S-CSCF.

Processes 612 to 614: The calling terminal sends an acknowledgement (ACK) message to the MGCF via the CSA as the ACK of the call.

Figure 7:
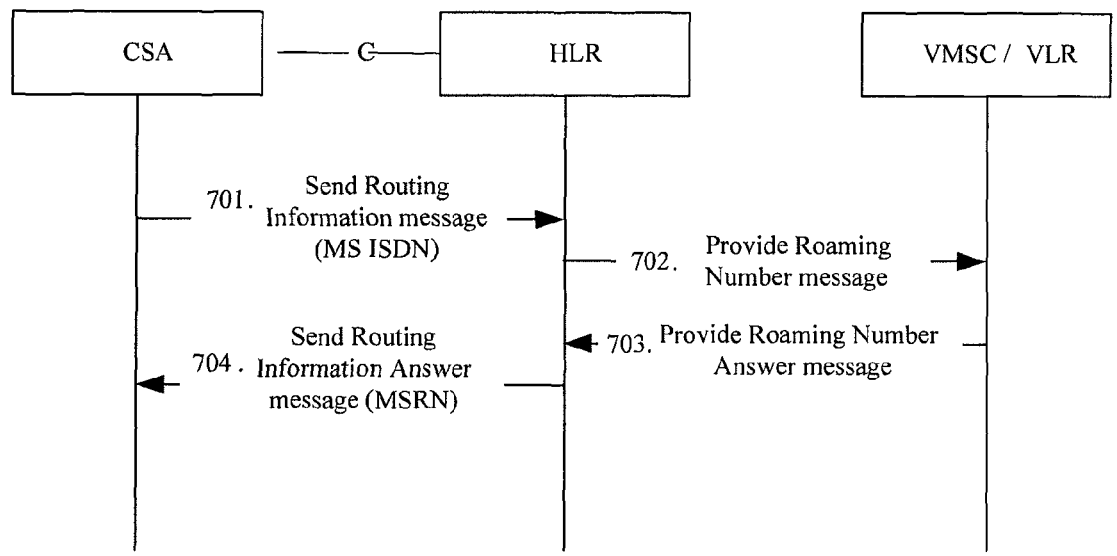
FIG. 7 is a flowchart illustrating a method for acquiring a CS Domain Routing Number (CSRN)
Figure 8:
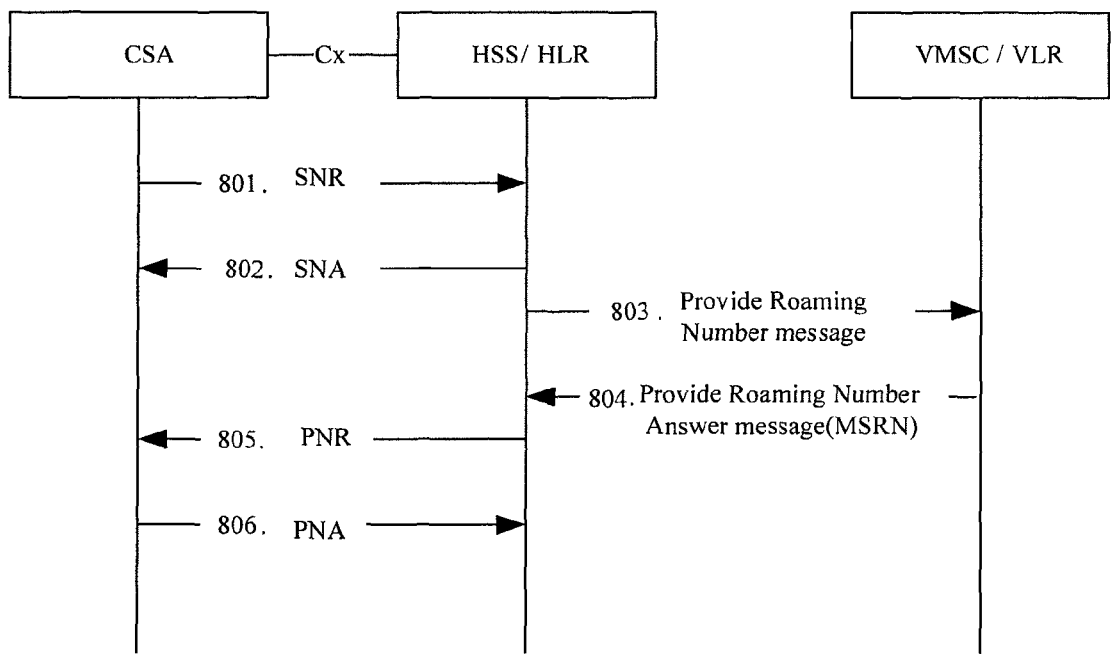
FIG. 8 is a flowchart illustrating another method for acquiring a CSRN.

There are many methods of acquiring a CSRN in FIG. 6 (as shown in FIGS. 7 and 8).

As shown in FIG. 7, it is a flowchart illustrating a method for acquiring a CSRN. The method includes processes described as follows.

Process 701: A CSA sends a Send Routing Information message to an HLR via an existing C interface of a CS network in the mode of analog GMSC or VMSC operation. The Send Routing Information message carries a UE number (MS ISDN).

Process 702: Upon the receipt of the Send Routing Information message sent from the CSA, the HLR sends a Provide Roaming Number (PRN) to a VLR to acquire a Mobile Station Roaming Number (MSRN) number.

Process 703: The VLR allocates an MSRN number to the UE, and returns to the HLR a Provide Roaming Number Acknowledgement (PRN-Ack) message carrying the MSRN number.

Process 704: The HLR sends the received MSRN number to the CSA for storage via the C interface. In the subsequent operations, the MSRN number is used as a CSRN number.

As shown in FIG. 8, it is a flowchart illustrating another method for acquiring a CSRN. The method includes processes described as follows.

Process 801: A CSA sends to an HSS or HLR an SNR carrying a public user ID and data to be subscribed via an existing Cx interface of the IMS network.

Process 802: The HSS or HLR sends an SNA to the CSA to determine that the subscription is successful.

Process 803: The HSS or HLR sends a PRN message to a VLR to acquire an MSRN number.

Process 804: The VLR allocates an MSRN number to the UE, and returns to the HSS or HLR a PRN-Ack message carrying the MSRN number.

Process 805: The HSS or HLR sends to the CSA a PNR carrying the received MSRN. The PNR may further carry a "CS-registered" parameter.

Process 806: The CSA saves the received MSRN. The MSRN number is used as a CSRN number in subsequent operations. The CSA sends a PNA to the HSS or HLR for acknowledgement.

As shown in FIG. 9, it is a flowchart illustrating another method for delivering a coming call in accordance with an embodiment of the present invention. The method includes processes described as follows.

Process 901: An INVITE sent from a calling terminal located at the IMS network is received by an S-CSCF.

Process 902: The S-CSCF transfers the INVITE to a CSA according to the address of the CSA registered during the IMS registration. In practical applications, the S-CSCF may change a Request Uniform Resource Identifiers (URI) of the INVITE from a SIP URI to a Tel URI.

Process 903: The CSA allocates an IP Multimedia Routing Number (IMRN), and delivers the IMRN to the UE via a USSD Request supporting the USSD or SMS. Certainly, the CSA may also deliver a Calling Phone Number (CgPN), so that the UE may determine whether to perform the subsequent answering operations according to the received CgPN.

Process 904: The UE answers the call by sending a USSD Response to the CSA.

Process 905: The UE initiates a call by sending a SETUP message in the CS network according to the received IMRN. The call is routed to a VMSC.

Process 906: The VMSC generates an IAM message carrying the IMRN, and sends the IAM message to an MGCF.

Process 907: The MGCF generates an INVITE carrying the IMRN, and sends the INVITE to the CSA via an I-CSCF.

Processes 908 to 909: The CSA searches corresponding calling number (CgPN) according to the received IMRN and saved ISDN of the UE, generates a 200 OK message, and sends the 200 OK message to the calling terminal via the S-CSCF according to the searched CgPN.

Processes 910 to 911: The calling terminal sends an acknowledgement (ACK) message to the CSA via the S-CSCF for acknowledgement.

Process 912: The CSA generates a 200 OK message and sends the 200 OK message to the MGCF to indicate that the establishment of the call is finished.

Process 913: The MGCF generates an ANM message and sends the ANM message to the VMSC to indicate that the establishment of the call is finished.

Process 914: The VMSC sends a connection message to the UE to indicate that the establishment of the call is finished.

Process 915: Upon the receipt of the 200 OK message, the MGCF sends an ACK message to the CSA as a call establishment acknowledgement.

As shown in FIG. 10, it is a flowchart illustrating a method for a UE initiating a call in accordance with an embodiment of the present invention. The method includes processes described as follows.

Process 1001: A UE initiates a call to a VMSC via a CS network. The method for initiating the call generally includes sending, by the UE, a SETUP message to the VMSC.

Process 1002: The VMSC sends an Initial Detecting Point (IDP) message to a CSA (a gsmSCF is set).

Process 1003: The CSA acquires and saves a called number from the received IDP message. Moreover, the CSA allocates an IMRN, and sends the IMRN to the VMSC a connection message carrying the IMRN.

Process 1004: The VMSC generates an IAM message carrying the IMRN and sends the IAM message to a MGCF. The called number of the IAM message is filled as the IMRN.

Process 1005: the MGCF generates an INVITE carrying the IMRN according to the received IAM message, and sends the INVITE to the CSA via an I-CSCF.

Processes 1006 to 1007: The CSA searches corresponding called number CdPN according to the received IMRN and saved ISDN of the UE, sets the found called number as a Request URI, and sends the INVITE carrying the CdPN to the called terminal via the S-CSCF.

Processes 1008 to 1010: The called terminal answers the call by sending a 200 OK message. The 200 OK message is sent to an MGCF via the S-CSCF and the CSA (gsmSCF is set).

Process 1011: The MGCF generates an ANM message and sends the ANM message to the VMSC to indicate that the call is answered.

Process 1012: The VMSC generates a connection message and sends the connection message to the UE to indicate that the call is answered.

Processes 1013 to 1015: The MGCF generates an ACK message and sends the ACK message to the CSA as acknowledgement. The CSA sends the received ACK message to the called terminal via the S-CSCF as acknowledgement.

As shown in FIG. 11, it is a flowchart illustrating another method for a UE initiating a call in accordance with an embodiment of the present invention. The method includes processes described as follows.

Process 1101: A UE sends to a CSA a USSD request message carrying a called number (CdPN).

Process 1102: The CSA saves the CdPN carried in the received USSD request message, allocates an IMRN, and sends a USSD response message carrying the IMRN to the UE.

Process 1103: The UE initiates a CS call to a VMSC according to the received IMRN. The method for initiating the call generally includes sending, by the UE, a SETUP message carrying an IMRN to a VMSC.

Process 1104: The VMSC sends an IAM message carrying the received IMRN to a MGCF. The called number of the IAM message is filled as the IMRN.

Process 1105: The MGCF generates an INVITE carrying the IMRN, and sends the INVITE to the CSA via an I-CSCF.

Processes 1106 to 1107: The CSA searches corresponding called number CdPN according to the received IMRN and saved ISDN of the UE, sets the found called number as a Request URI, and sends the INVITE carrying the CdPN to the called terminal via the S-CSCF.

Processes 1108 to 1110: The called terminal answers the call by sending a 200 OK message. The 200 OK message is sent to the MGCF via the S-CSCF and the CSA.

Process 1111: The MGCF generates an ANM message and sends the ANM message to the VMSC to indicate that the call is answered.

Process 1112: The VMSC generates a connection message and sends the connection message to the UE to indicate that the call is answered.

Processes 1113 to 1115: The MGCF generates an ACK message and sends the ACK message to the CSA as acknowledgement. The CSA sends the received ACK message to the called terminal via the S-CSCF as acknowledgement.

Figure 12:
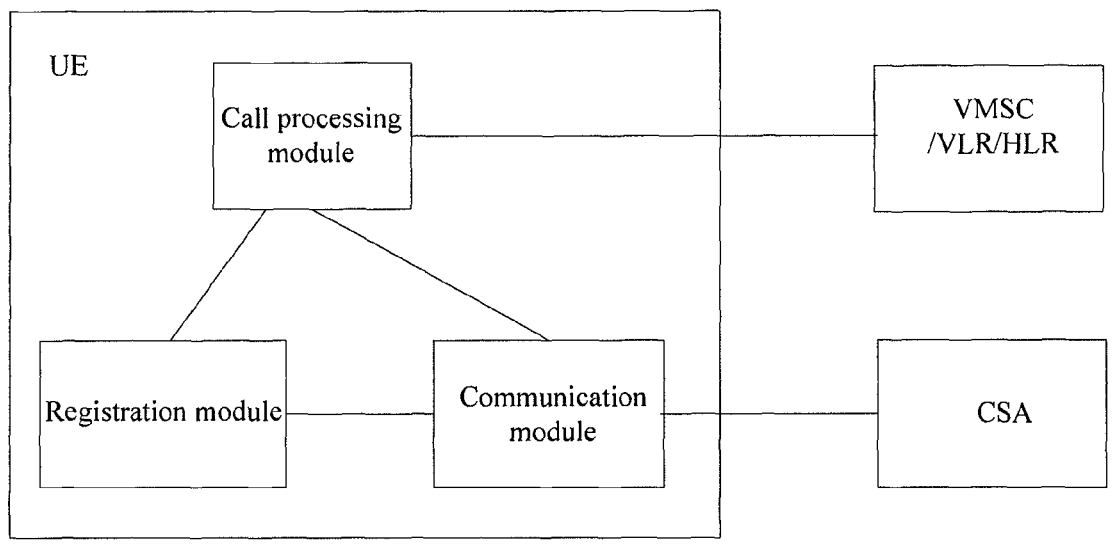
FIG. 12 is an apparatus structure schematic diagram of a UE in accordance with an embodiment of the present invention.
Figure 13:
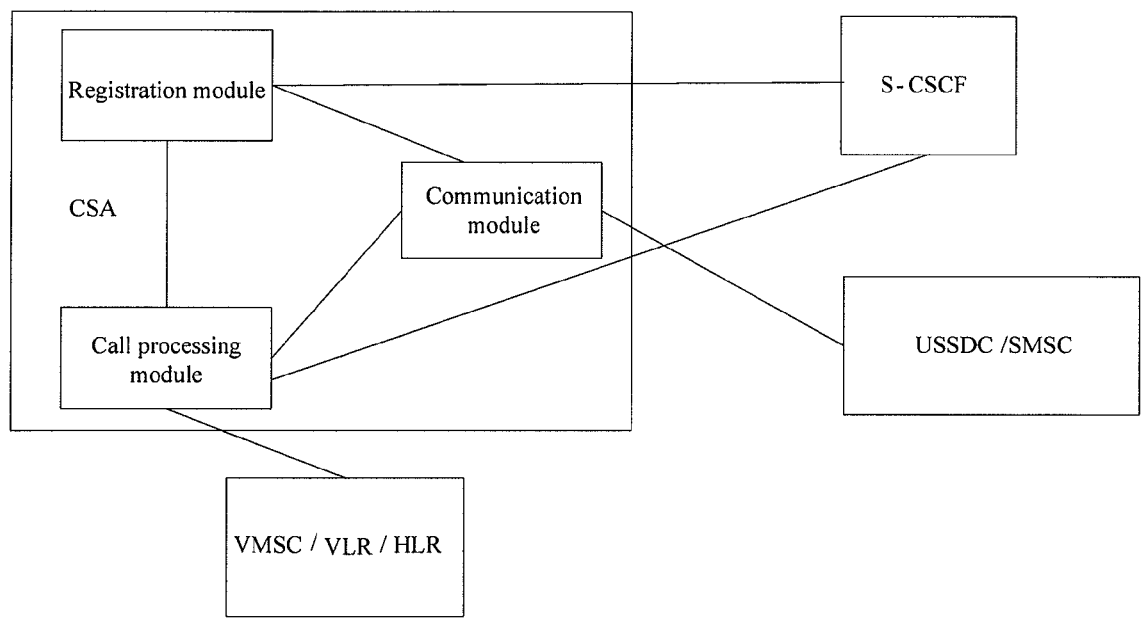
FIG. 13 is an apparatus structure schematic diagram of a CSA in accordance with an embodiment of the present invention.

In practical applications, to guarantee that a CSA is able to support a UE to access an IMS service platform via a CS network, the UE and the CSA are respectively configured as shown in FIGS. 12 and 13.

As shown in FIG. 12, it is an apparatus structure schematic diagram of a UE in accordance with an embodiment of the present invention. In FIG. 12, a UE consists of a call processing module at the UE side, a registration module at the UE side and a communication module at the UE side. The three modules connect with each other.

The communication module at the UE side is adapted to transmit bidirectional authentication information between the UE and an S-CSCF and call establishment information. The communication module at the UE side may be a USSD application module, an SMS application module or other data communication application modules at a CS network side. The communication module at the UE side may further save the address information of a CSA (in practical, the address of the CSA may be saved in any module included by the UE). The registration module at the UE side is adapted to implement the IMS registration via a CS access technology, for example report a private user ID and a public user ID to the CSA. In addition, the registration module at the UE side is further adapted to send the private user ID and the public user ID of the UE to the CSA, and perform the IMS authentication operation and bidirectional authentication operation. In practical applications, the registration module at the UE side generally communicates with the CSA via the communication module at the UE side. The call processing module at the UE side is adapted to establish a call entering an IMS network from a CS network (the call is transmitted by a call branch at the CS network side between the UE and the CSA). The session processing of the call may generally be performed by the S-CSCF.

As shown in FIG. 13, it is an apparatus structure schematic diagram of a CSA in accordance with an embodiment of the present invention. In FIG. 13, a CSA consists of a call processing module at the CSA side, a registration module at the CSA side and a communication module at the CSA side. The three modules connect with each other.

The communication module at the CSA side is adapted to transmit bidirectional authentication information between a UE and an S-CSCF and call establishment information. The communication module at the CSA side may be a USSD application module, an SMS application module, or other data communication application modules at the CS network. The registration module at the CSA side, instead of a UE, is adapted to perform the IMS registration to implement the IMS registration via a CS access technology, for example to send a registration request to an S-CSCF, or save the address of an S-CSCF allocated to the UE and at least one public user ID of the UE. The call processing module at the CSA side is adapted to establish a call branch at the CS network side between the UE and the CSA. The method for establishing the call branch includes sending a request related to the call to the S-CSCF and the UE. The call is sent to an IMS network via the CS network. The session processing of the call is generally performed by the S-CSCF.

As can be seen from the above description, the system, apparatus and method provided by embodiments of the present invention may support a UE to access an IMS service platform via a CS network, which effectively reduces the cost.

The invention claimed is:

1. A method for providing services, comprising:
 registering a User Equipment (UE) in a Circuit Switched (CS) network;
 registering the UE in an IP Multimedia Sub-system (IMS) network, wherein registering the UE in the IMS network comprises registering CS access capability of the UE in the IMS network;
 establishing a call branch at a CS network side between the UE and the IMS network for an IMS session;
 by a CS adapter (CSA), receiving a mobility management notification sent from a Visit Location Register (VLR) via a Customized Applications for Mobile network Enhanced Logic (CAMEL) mechanism, acquiring the information that the UE has registered in the CS network according to the mobility management notification, and generating a Session Initial Protocol (SIP) registration request;
 by the CSA, sending the SIP registration request to a serving-call and session control function (S-CSCF); and
 by the S-CSCF in the IMS network, acquiring user configuration data of the UE and registering at least one public user ID of the UE.

\* \* \* \* \*